United States Patent [19]

Blalock et al.

[11] 3,878,723
[45] Apr. 22, 1975

[54] THERMAL NOISE POWER THERMOMETRY

[75] Inventors: Theron V. Blalock, Knoxville; Casimer J. Borkowski, Oak Ridge, both of Tenn.

[73] Assignee: The United States of America as represented by the United States Atomic Energy Commission, Washington, D.C.

[22] Filed: Apr. 15, 1974

[21] Appl. No.: 461,320

[52] U.S. Cl. .............................. 73/359; 73/362 AR
[51] Int. Cl. .............................................. G01k 7/30
[58] Field of Search ............... 73/339 R, 359, 362 R, 73/362 AR; 324/71 R

[56] References Cited
UNITED STATES PATENTS

| | | | |
|---|---|---|---|
| 2,820,945 | 1/1958 | Marsden | 324/71 R X |
| 2,847,643 | 8/1958 | De Boisblanc | 73/339 R X |
| 2,884,786 | 5/1959 | Burk et al. | 73/359 |
| 3,818,761 | 6/1974 | Brixy et al. | 73/359 |

*Primary Examiner*—Herbert Goldstein
*Assistant Examiner*—Frederick Shoon
*Attorney, Agent, or Firm*—Dean E. Carlson; David S. Zachry; David E. Breeden

[57] ABSTRACT

A system for measuring temperature has been provided wherein the absolute temperature $T_x$ is determined by measuring the thermal noise power, i.e., the product of the thermal noise voltage and the thermal noise current generated by a sensing resistor at temperature $T_x$. The measured thermal noise power from the sensing resistor is a linear function of absolute temperature. The system senses the thermal noise voltage by means of a voltage-sensitive preamplifier and the thermal noise current by means of a current-sensitive preamplifier. The signals from the two preamplifiers are separately detected and stored in separate sample-and-hold circuits after which they are multiplied in a multiplier to obtain an output proportional to the thermal noise power. This means of temperature measurement is independent of the sensing-resistor composition, the mass and nature of the charge carriers, and, in principle, the ohmic value of the sensing resistor.

8 Claims, 5 Drawing Figures

THERMAL NOISE POWER THERMOMETRY

BACKGROUND OF THE INVENTION

This invention was made during the course of, or under, a contract with the United States Atomic Energy Commission.

This invention relates generally to the art of electronic thermometry and more specifically to the art of thermal noise thermometry in which the temperature of a sensing resistor is determined by measuring the thermal noise power independent of the resistor value.

Thermal noise thermometry is based on the early work of Johnson an Nyquist as reported in *Physics Review*, Vol 32, pp. 97–110, 1928. Johnson found that a fluctuating potenial difference exists between the terminals of an electrical conductor due to thermal agitation of the charge carriers in the conductor. Further, it was found that when the temperature of an unloaded resistor was varied, the mean-squared noise voltage across the resistor was proportional to the resistance and the absolute temperature of the resistor, independent of the material, size and shape of the resistor.

Nyquist approached the same phenomenon theoretically. He used general thermodynamic considerations and statistical mechanics to calculate the fluctuating potential due to thermal agitation in a conductor. His calculations were identical with Johnson's observations and resulted in the voltage-fluctuation effects being called Johnson noise (thermal noise) and the expression for it being referred to as the Nyquist formula.

According to the Nyquist formula, for temperatures above room temperature (300°K), the thermal noise voltage appearing across an unloaded resistor may be expressed as $$\overline{e^2} = 4\ KTR$$

where $\overline{e^2}$ is the root-mean-square (rms) noise voltage, $K$ is the Boltzmann gas constant, $T$ is temperature (absolute), and $R$ is the resistance. Since thermal agitation in the resistor is the source of the noise voltage $\overline{e}$, the noise contains all frequencies up to very high frequencies at equal amplitudes. The value of $\overline{e^2}$ therefore corresponds to a noise voltage spectrum (spectral density) and has the units V²/Hz. The Nyquist formula as shown above has been shown to be accurate for all frequencies up to about 1 GHz. That is, if the noise voltage is measured in a bandwidth of frequencies located below about 1 GHz, and the resistor value, $R$, is known, the absolute temperature of the resistor can be determined from the equation above.

Several noise thermometry systems have been developed since the work of Nyquist and Johnson and almost without exception they incorporate the ratio or null method, known as the Garrison and Lawson method. This method achieved a higher degree of accuracy than was possible by a straightforward application of the basic Nyquist formula. In addition to the resistance $R$ at the unknown temperature $T_1$, they employed an adjustable resistance $R_2$ at a known temperature $T_2$. The temperature measurement is based on the relationship $$T_1 = T_2 R_2 / R_1$$

which is valid when the noise voltage from $R_2$ has been adjusted by changing $R_2$ until the noise voltage of $R_2$ equals that of $R_1$.

Since the work of Garrison and Lawson, several other noise thermometry systems have been developed. However, all the known systems are based on the above-described ratio method. They ordinarily utilize the same measurement system to interrogate both the reference and sensing resistors and incorporate remote switches for comparing the two noise voltages until they can be made equal to each other.

All of the known systems for performing noise thermometry require knowledge of the exact resistance value of the sensing resistor. This requirement becomes an important limitation, especially at high temperatures where it may be difficult to accurately measure the resistance that is generating the thermal noise. Furthermore, having to measure the sensing resistance adds significant complexity to the system, reduces the accuracy of the temperature determination, ad increases the time between successive temperature readings.

The present invention eliminates these problems in temperature measurement by measuring the thermal noise power produced by a sensing resistor and has the significant advantage of not requiring measurement of the value of the sensing resistor during temperature measurements.

SUMMARY OF THE INVENTION

In view of the above problems associated with the art of thermal noise thermometry, it is a principal object of this invention to provide a means of thermal noise thermometry from a sensing resistor disposed in a medium whose temperature is to be measured by measuring the thermal noise power generated in the sensing resistor, thereby eliminating the measurement of the ohmic value of the sensing resistor.

Further, it is an object of this invention to provide a system for measuring absolute temperature through measurement of the thermal noise power of a sensing resistor placed in a medium whose temperature is to be measured by obtaining the product of the separately detected thermal noise voltage and thermal noise current.

Other objects and many of the attendant advantages of the present invention will be obvious to those skilled in the art from the following detailed description taken in conjunction with the drawings.

DETAILED DESCRIPTION

The measurement concept of the subject development is based on two equivalent noise models for an unloaded sensing resistor. The first noise model is that of the resistor (R) in series with a noise voltage generator $\overline{e_{nr}}$. A high input impedance, voltage-sensitive amplifier is required to amplify the voltage $\overline{e_{nr}}$ over some noise bandwidth $\Delta f_r$. This first model is recognized as being equivalent to the traditional Nyquist derivation. The other equivalent noise model for the resistor is one having the resistor (R) in parallel with a noise current generator $\overline{i_{nr}}$. The current spectrum may be amplified in some noise bandwidth $\Delta f_i$ by a low input impedance, current-sensitive amplifier.

For the first model the root-mean-square noise voltage at the output of the voltage amplifier would be $$\overline{e_{nv}^2} = K_v(4kT_sR\Delta f_v)$$

and, for the other model, the voltage at the current amplifier output would be $$\overline{e_{ni}^2} = K_i(4kT_s\Delta f_i/R)$$

where $K_v$ and $K_i$ are gain constants. Multiplication of these two output noise signals gives the following equation:

$$P_n = (\overline{e_{nv}^2})^{1/2}(\overline{e_{ni}^2})^{1/2} = CT_s$$

where $C = 4k\ K_vK_i(\Delta f_v\Delta f_i)^{1/2}$.

The important result expressed by this equation is that the absolute temperature ($T_s$) is independent of the value of the sensing resistor $R$. Multiplication of the thermal noise voltage by the thermal noise current gives the thermal noise power, which is indeed independent of the value of resistor $R$. Thus, in principle, the absolute temperature of a resistor can be measured without knowledge, not only of the resistor materials, but of the ohmic value of the resistor as well. The combination of the open-circuit voltage and short-circuit current noise measurements results in a thermometry system which is well suited for use in nuclear reactors in that it is unaffected by transmutation of the sensing resistor materials.

Figure 1:
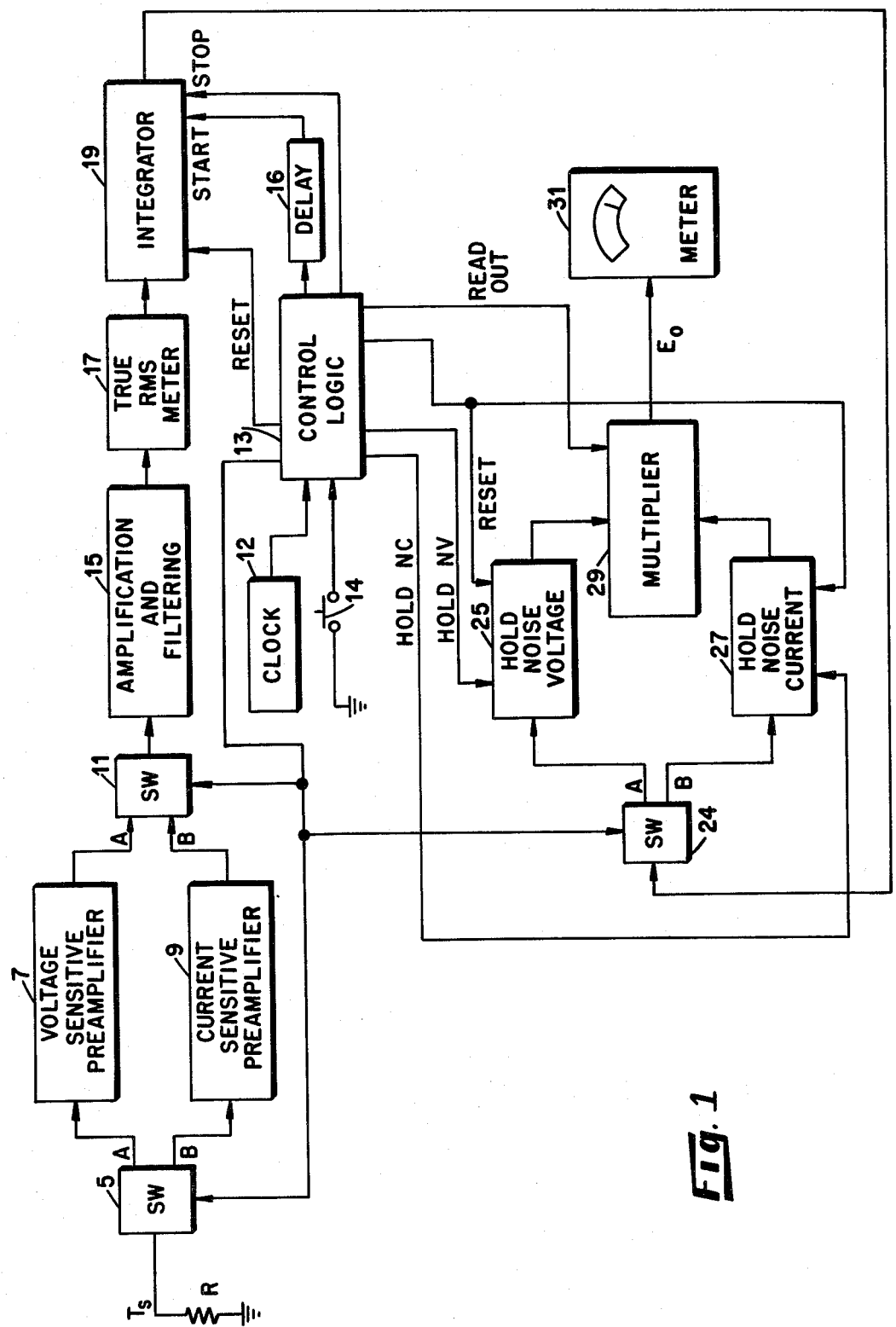
FIG. 1 is a block diagram of a system according to the present invention for determining the temperature $T_s$ of a sensing resistor R by measuring the thermal noise power generated in the sensing resistor.

Referring now to FIG. 1, there is shown a system according to the present invention for measuring thermal noise power generated by a sensing resistor R. The sensing resistor R is disposed in a medium whose absolute temperature $T_s$ is to be measured. The resistor R is connected at one end to ground potential and at the other end to the common terminal of a two-position switch 5 controlled from a logic circuit 13, as will be explained hereinbelow. Since the signal level through switch 5 is extremely low and must be isolated from extraneous noise, switch 5 may preferably be a low contact noise reed switch or relay which may be switched from a first position A to a second position B by a switch command signal.

The first position terminal A of switch 5 is connected to the input of a voltage-sensitive preamplifier 7 while the second position terminal B is connected to the input of a current-sensitive preamplifier 9. The outputs of preamplifiers 7 and 9 are connected, respectively, to first and second position terminals A and B, respectively, of a command-controlled two-position switch 11.

Figure 2:
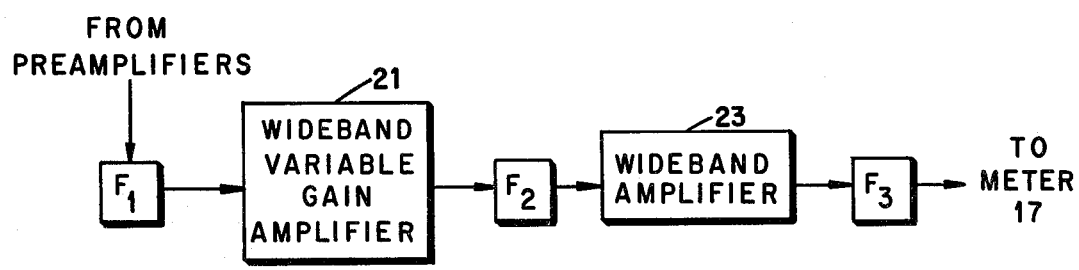
FIG. 2 is a more detailed block diagram of the amplification and filtering circuit of FIG. 1.

The common terminal of switch 11 is connected to the input of an amplification and filtering circuit 15, shown in more detail in FIG. 2. The frequency bandpass of the system is controlled by conventional cascaded bandpass filters $F_1$, $F_2$, and $F_3$ properly distributed between wideband gain sections 21 and 23 to preserve adequate dynamic range for the noise signals. The filters are conventional passive RC networks; each filter containing two low-pass sections and two high-pass sections so that the noise frequencies selected may be centered around 45 KHz. The amplifier 21 is a wideband (1 Hz to 8 MHz) amplifier with an adjustable voltage gain in the range of approximately 3 to 12,200. The purpose of the gain adjustment is to allow for increased temperature measurement range. Amplifier 23 is also a wideband amplifier with a gain of about 20. The cascade connection of the three filters $F_1$, $F_2$, and $F_3$ produces a bandpass frequency response for the circuit 15 centered at about 45 KHz with skirt slopes of approximately − 30dB/octave and an equivalent noise bandwidth of about 40 KHz.

The AC noise signal at the output of circuit 15 is detected by a true root mean squared detector which converts the rms AC signal value to a DC signal having an amplitude proportional to the rms value. A true rms voltmeter 17 may be used which is connected to the output of circuit 15. The voltmeter 17 may be one of various conventional true rms voltmeters such as the Model HP3400 produced by Hewlett Packard, Palo Alto, Calif. These meters 17 provide the DC signal at an output thereof. This output is connected to the input of an integrator circuit 19 whose integrating period is controlled from logic circuit 13. Since the output of the meter 17 fluctuates statistically, the signal is integrated over a selected period to obtain a specified accuracy. Typically, the integrating time may be selected in the range of from 1.0 to 100 sec., depending on the accuracy desired.

It will be noted at this point in the circuit that the noise voltage and noise current (equivalent voltage value) values may be separately read out and recorded by hand and mutliplied together to obtain the noise power and thus the temperature of the sensing resistor R. This may be accomplished by using a conventional integrating voltmeter in place of the integrator 19. However, to provide a direct output proportional to the temperature, a pair of conventional sample-and-hold circuits 25 and 27 may be used to sample the noise voltage signal and noise current signal, respectively, upon commands from logic circuit 13. The signals of circuits 25 and 27 are simultaneously applied by a readout command from logic circuit 13 to a multiplier 29 whose output signal $E_o$ is indicative of the noise power. The output of multiplier 29 may be connected to a voltmeter 31 which is calibrated to read the sensor R temperature directly in degrees absolute.

The output of integrator 19 is connected to the common terminal of a two-position (A and B) command controlled switch 24. The first position terminal A is connected to the sample-and-hold circuit 25 and the second position terminal B is connected to sample-and-hold circuit 27.

The control logic circuit 13 may be of conventional design to provide command outputs at specific times regulated by a fixed frequency clock signal from a clock 12 connected to the input of logic circuit 13 to drive a counter within circuit 13. The logic circuit outputs may be timed by gated outputs from the counter stages. The first output is connected to switch command inputs of the switches 5, 11, and 24 so that the switches are set in the first position (A) when the logic circuit 13 is manually or automatically reset, as by depressing switch 14 applying ground to the reset input of logic circuit 13. Simultaneous with the setting of the switches to position A, the sample-and-hold circuits 25 and 27 are reset via the reset line from logic circuit 13 to separate reset inputs thereof and the integrator is reset via a separate line connected to a reset input of integrator 19.

With the switches 5, 11, and 24 in the A position the circuit is set to sample the thermal noise voltage from resistor R. The sampling begins when a start pulse is applied through a delay circuit 16 to the start input of integrator 19. Typically, the delay time would be a few seconds to allow the system transients following switching to settle before the integration begins. The selected integrating period continues until a stop generated by the logic circuit 13 is applied via a line to the stop input of integrator 19. At the end of the first integration period, the noise voltage signal is stored in the sample-and-hold circuit 25 by a signal applied via the noise voltage command line connected to circuit 25.

To sample the noise current, the logic circuit 13 provides a switching command to set switches 5, 11, and 24 to the B position and essentially the same cycle as before is repeated. The integrator 19 is reset, and after a delay the integrating period beings until a stop command is applied to the stop input of integrator 19. Then the sample-and-hold circuit 27 is activated by a command via the hold noise current line connected to circuit 27. Once the two voltages are stored in the hold circuits 25 and 27, a command is applied via a readout command line to multiplier 29 to read out the product ($E_o$) of the signals held in circuits 25 and 27 to meter 31. The multiplier may be either a conventional analog multiplier as exemplified here (requiring only a readout command) or a digital multiplier, in which case an additional command, to read the sample-and-hold circuits 25 and 27 prior to a meter 31 readout, would be required. In either case the total time required for a readout following the initial resetting of the control logic circuit 13 would be twice the integrating time plus a few seconds needed for the switching operations.

Figure 3:
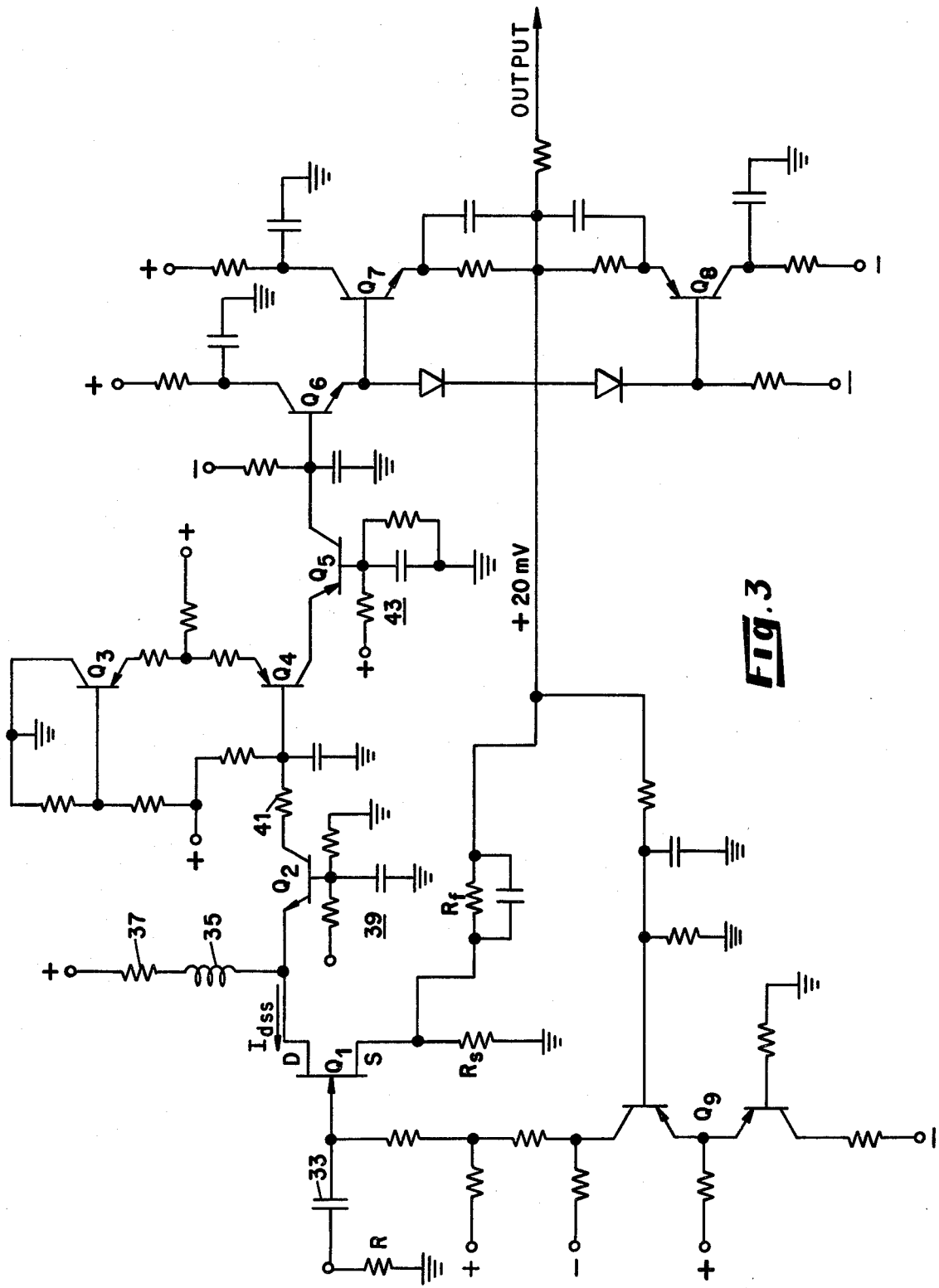
FIG. 3 is an electrical schematic diagram of the voltage-sensitive preamplifier of FIG. 1.

Referring now to FIG. 3, there is shown a schematic diagram of a special design voltage-sensitive preamplifier 7 including the sensing resistor R. Preamplifier 7 is designed to sense the thermal noise voltage of the sensing resistor R. The noise voltage preamplifier 7 must be designed to provide a high input impedance so that essentially open circuit noise voltage is sensed while maintaining low input stage noise $R_{nr}$ (equivalent noise resistance contributed by the preamplifier), adequate gain stability, and wide enough noise bandwidth.

The input stage consists of three high-transconductance (gm) field-effect transistors (represented as $Q_1$) connected in parallel to give a composite device with $I_d$ = 68mA, gm = 96,000 micromhos, and total device input capacitance of about 33 pf. $Q_1$ is operated with slightly negative gate-to-source voltage to provide a reasonable margin against forward biasing. The $Q_1$ drain voltage (4.2V) is set slightly above pinch-off to ensure saturation operation with minimized channel power dissipation. Low FET channel temperature is necessary to maintain a low value of amplifier equivalent noise resistance ($R_{nr}$).

The sensing resistor R is connected through a capacitor 33 to the gate of FET $Q_1$. The drain of FET $Q_1$ is connected to the emitter of an NPN coupling transistor $Q_2$ (cascade connection) while the source is connected through a feedback resistor $R_s$ to ground. Further, the drain of $Q_1$ is connected to a source of positive supply voltage through a series connected inductor 35 and biasing resistor 37. The purpose of the inductor 35 is to decrease the noise contribution of the resistor 37.

The base of transistor $Q_2$ is connected to a biasing circuit 39. The collector of $Q_2$ is connected through a resistor 41 to the base of a PNP transistor $Q_4$ amplifier stage. The emitter of $Q_4$ is coupled to the emitter of a PNP transistor $Q_3$ which together form a differential pair amplifier. The collector of transistor $Q_4$ is connected through a PNP transistor $Q_5$ to a complementary output stage consisting of transistors $Q_6$, $Q_7$, and $Q_8$ and associated biasing circuitry. The coupling transistors $Q_2$ and $Q_5$ are provided to eliminate Miller capacitance at the inputs of the $Q_1$ and $Q_4$ stages, respectively.

The output of the amplifier is fed back to the source of FET $Q_1$ through a small series feedback resistor $R_f$. Since the low-noise requirement constrains $R_s$ to be small, $R_f$ must also be small so that the parallel connection of $R_s$ and $R_f$ is small and yet maintains a high closed loop gain $A_{CL} = (R_f + R_s/R_s) = 200$ Additional feedback is provided to the gate of FET $Q_1$ by means of a DC loop including transistor $Q_9$ circuit. The transistor $Q_9$ is a differential pair that operates both as a reference DC level for the output and also as a DC amplifier.

As pointed out above the feedback resistance $R_s$ and $R_f$ must be kept low to minimize noise resistance ($R_{nr}$) in the preamplifier. It was estimated in the initial design that $R_s$ would contribute about 0.5 ohm noise resistance, and the remaining portion of the preamplifier following the first stage would congtribute about 0.5 ohm. The total expected noise resistance for the preamplifier was about 10.2 ohms. The actual measured value of $R_{nr}$ was 10.6 ohms.

Although this value of $R_{nr}$ is quite low, it is still sufficiently high to cause a noticeable error in thermal noise measurements for low values of the sensing resistor R at low temperatures (T). However, a compensation technique was developed that minimizes the effects of noise by automatically adjusting the gain of the current preamplifier as R and $T_s$ change, as will be explained with reference to FIG. 4. The output of preamplifier 7 is a voltage $\overline{e_{ni}^2} = A_v(4kT_sR\Delta f_n)$ where $A_v$ is the amplifier gain, $k$ is Boltzmann's constant, $R$ is the resistance of the sensing resistor, $T_s$ is the sensing resistor temperature, and $\Delta f_n$ is the noise frequency bandwidth.

Figure 4:
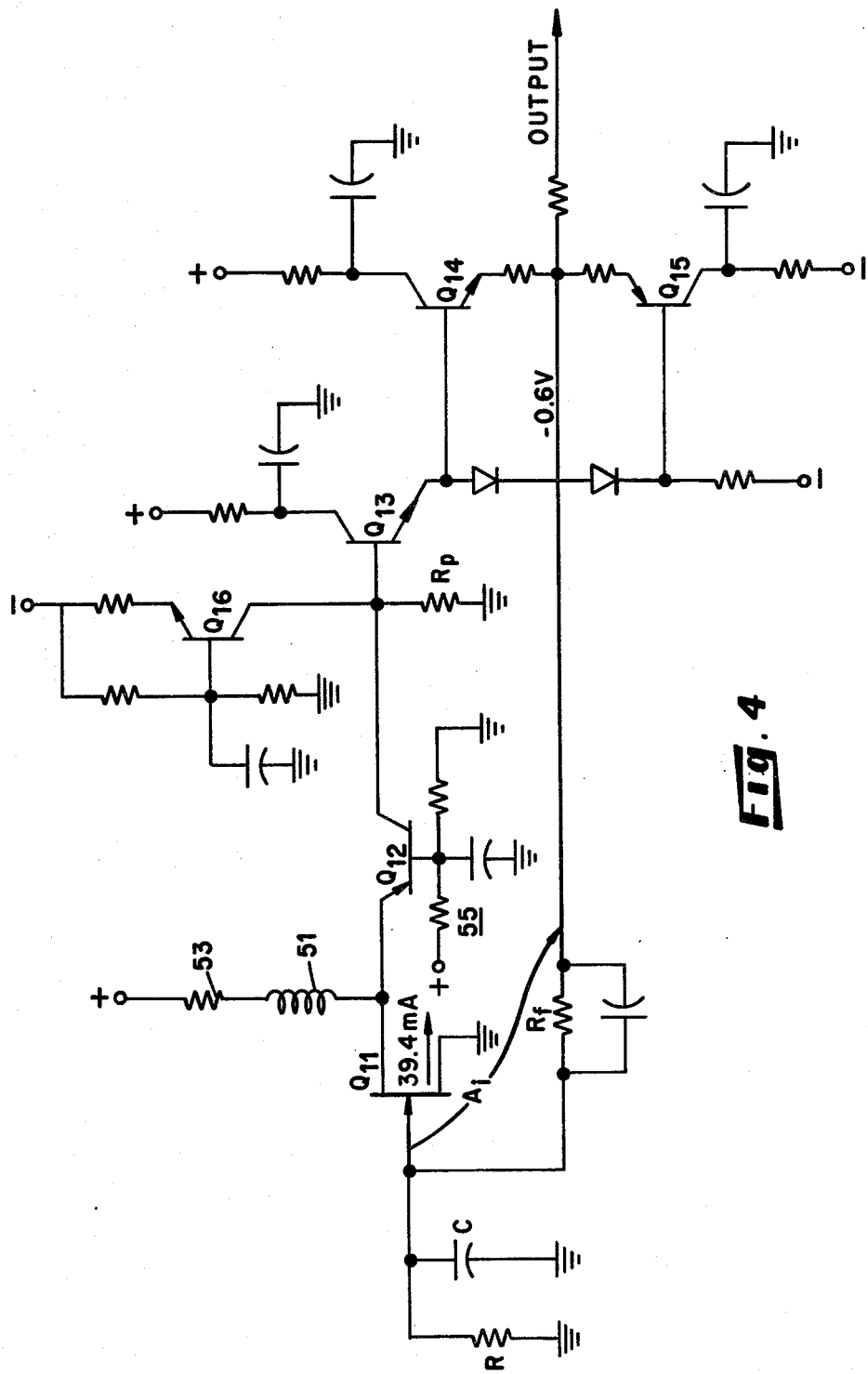
FIG. 4 is an electrical schematic diagram of a current-sensitive preamplifier of FIG. 1.

Referring now to FIG. 4, there is shown a schematic diagram of a special design current-sensitive preamplifier 9 including the sensing resistor R. Preamplifier 9 is designed to sense the thermal noise current of the sensing resistor R. As in the voltage-sensitive preamplifier above, the input stage consists of three FET's connected in parallel, represented as $Q_{11}$. The source of $Q_{11}$ is connected to ground and the drain is connected through a PNP coupling transistor $Q_{12}$ to a complementary output stage consisting of $Q_{13}$, $Q_{14}$, and $Q_{15}$ transistors and associated circuitry.

The drain of $Q_{11}$ is connected to the positive voltage source through a series inductor 51 and biasing resistor 53, for the same purpose as discussed above with reference to preamplifier 7. The base of transistor $Q_{12}$ is connected to a biasing circuit 55 and the collector, connected to the output stage, is also connected to ground through an open loop gain setting resistor $R_p$. The collector of $Q_{12}$ is also connected to a negative voltage source through a transistor $Q_{16}$ which is a constant current source. The output of the amplifier is connected through a feedback resistor $R_f$ to the gate of transistor $Q_{11}$.

The sensing resistor and its total parallel capacitance C have considerable effect on the signal characteristics of the current-sensitive preamplifier. The reason is that current-sensitivity is achieved by shunt feedback with the consequent inclusion of the sensing resistor network in the preamplifier loop transmission. Thus, the preamplifier transfer function for thermal noise current from the sensing resistor can be influenced by the parallel RC input network. Furthermore, the transfer function for the electronic noise generators inside the preamplifier loop can also be strongly affected by R and C.

The composite FET $Q_{11}$ transconductance, at 39.4 mA drain current, is about 71,000 micromhos which gives a calculated device noise resistance $R_{nc}$ of about 11Ω. The measured value was near 12Ω. Resistors $R_p$ and $R_f$ determine, respectively, the preamplifier forward-loop voltage gain A and the feedback factor. These resistors can be adjusted to compensate the output voltage signal for electronic noise generated in both preamplifiers for the change in sensing resistor R with temperature.

To minimize the noise contribution from the forward loop, it has been found that the thermal noise current of the sensing resistor should be measured in a frequency band below $f = f_\tau = \frac{1}{2\pi\tau}$, where $\tau$ is the input RC time constant. Also, the thermal noise voltage from the sensing resistor is decreased for frequencies above $f_\tau$. Thus, the thermal noise power generated in R should be measured in a frequency band located below $F_\tau f_\tau$ in frequency space.

To ensure that feedback resistor $R_f$ contributes 0.1% to the current preamplifier output noise voltage, $R_f$ should be chosen so that $$R_f \geq 500 \, (RT_a/T_s)^{max},$$

where $T_a$ is the ambient temperature and $(RT_a/T_s)^{max}$ is determined from the range over which temperature $T_s$ is to be measured and the approximate change of the value of R over that range.

If $R_f$ is chosen to satisfy the above inequality and the frequency band in which the noise power is measured is sufficiently below $f_\tau$, the output of the multiplier of FIG. 1 is $$E_o = C \, T_s \, M^{1/2},$$

wherein C is a constant, $$M = (1 + R_{nv}/\alpha R) \, [1 + R_{nc}/\alpha R \, (1 + R/R_f)^2](1 + R_f/A_v R)^{-2},$$

and $\alpha$ is the ratio $T_s$:$T_a$. Quantity M is the preamplifier noise compensation factor and gives the effect of the noise generated in the preamplifiers. Ideally, the value of M should be unity, which would occur if $R_{nc}$ and $R_{nv}$ were zero and $R_f/A_v R \ll 1$. At very high temperatures, M can be made to approach unity even for finite $R_{nc}$ and $R_{nv}$ if the forward path gain is sufficiently high. For example, if $R_{nc} = R_{nv} = 12\Omega$, $R_f = k\Omega$, R ≈ 800Ω, and $A_v$ is sufficiently high, then the sensor temperature would have to be greater than 2400 K to cause $M^{1/2}$ to be within 0.2% of unity.

The proper values of $A_v$ and $R_f$ in the equation for M will restrict the fluctuation of M over a prescribed temperature range and, consequently, will cause compensation for the finite values of the voltage preamplifier ($R_{nv}$) and the current preamplifier ($R_{nc}$) by decreasing the current preamplifier gain as the sensing resistor decreases in value. This compensation technique requires knowing approximately how the sensing resistor R varies over the temperature range of interest. The actual compensation may be best accomplished by generating a set of curves of $M^{1/2}$ vs $T_s$ for several values of $A_v$ after $R_f$ is fixed by a design criterion similar to the relationship set forth above. The value of $A_v$ that minimizes the fluctuation of M over the prescribed temperature range is chosen. This value of $A_v$ is set by the resistor $R_p$ in the circuit of FIG. 4, since $A_v \approx g_m R_p$.

The actual value of sensing resistance need be known only approximately to effect compensation and can be most easily accomplished when the sensing resistor variation can be approximated as a linear function of temperature. The slope of the function can be either positive or negative. Other more complex functions might restrict the temperature range over which compensation could be successfully implemented.

The degree of compensation achieved also depends strongly on the values of $R_{nc}$ and $R_{nv}$. These values should be as low as possible. It is probably possible to achieve values of $R_{nc}$ and $R_{nv}$ as low as 4Ω by connecting more FET's in parallel in the preamplifier input stages and cooling the FET's to their optimum temperatures.

The output of preamplifier 9 is a voltage proportional to the noise current generated in the sensing resistor.

$$\overline{e_{ni}^2} = A_i(4kT\Delta f_i)R$$

where $A_i$ is the preamplifier 9 gain over the noise current frequency spectrum $\Delta f_i$.

When the noise voltage value $\overline{e_{nv}^2}$ is multiplied by the noise current value $\overline{e_{ni}^2}$ to obtain the noise power:

$$P_n = (\overline{e_{nv}^2})^{1/2} \, (\overline{e_{ni}^2})^{1/2} = E_o \, (FIG. 1)$$

the important result is that the absolute temperature $T_s$ is essentially independent of the value of the sensing resistor R.

Although the above examples of preamplifiers 7 and 9 have been shown and briefly described to completely show the preferred embodiment of the invention, it will be obvious to those skilled in the art that various other preamplifier designs may be used, depending upon the degree of accuracy required in a particular application. The preamplifiers shown in FIGS. 3 and 4 have been employed to achieve an accuracy of better than ±0.1% in the temperature range of from 730° to 1275° absolute. The design objective was for the preamplifiers 7 and 9 to accommodate a sensing resistor having a value in the range of from 150 to 1500 ohms for temperatures above room temperature (about 300°K), a resistance value range that has been found by experience to be the most desirable.

In an experimental system temperature measurements were made using two platinum sensing resistors $R_1$ and $R_2$ having resistance values including lead wires of 100.51 and 100.41 ohms, respectively, at ice bath temperature.

The platinum resistance elements were installed in the end of and Inconel probe sheath along with a calibrated platinum-10% rhodium vs platinum thermocouple to check the thermal noise power temperature measurements. The Inconel probe was terminated in a steel box that contained a gold-plated wafer switch so that three values of the sensing resistors could be selected to simulate aging or other changes in the resistance value of a sensing resistor. The three values selectable were $R_2$ only, $R_1$ in series with $R_2$, and $R_1$ in parallel with $R_2$. The output from the wafer switch was connected to the common terminal of switch 5 of FIG. 1.

An electric furnace was used to heat the sensing resistor probe arrangement to selected controlled temperature levels. The furnace core was an Inconel-clad copper cylinder which provided a stable and uniform temperature environment for the sensing resistors. The sensing probe was covered with a ceramic cylindrical sheath and inserted into the furnace core. The operating temperature of the furnace was limited to about 1323°K by the melting point of the furnace copper core. The experiments were performed in an area of exceedingly high electrical background noise on the AC power lines and ground lines. Also, a high radio frequency flux permeated the area.

Experimental data points were accumulated by the following procedure: The furnace was set to a specific temperature by manually adjusting the furnace heater coil voltage. After equilibrium was established, the value of both platinum resistors $R_1$ and $R_2$ was determined with a constant current source and an integrating digital voltmeter set for a 10-sec. integration time. Simultaneously with the resistance measurement, the thermocouple output was also measured with an integrating digital voltmeter set for a 10-sec. integration time. Next the noise voltages and noise currents from $R_2$, $R_1$ in parallel with $R_2$ and $R_1$ in series with $R_2$ were measured with the circuit of FIG. 1, excluding the output circuit for determining the product. The integrator 19 was an integrating digital voltmeter with an integrating time setting of 10 sec. There were six 10-sec. noise measurements to obtain the noise voltage and current values read out from the integrating digital voltmeter and the product was calculated by hand. A 10-sec. average value of the thermocouple voltage was obtained simultaneously with each noise measurement.

The experimental results are summarized in the table below. The true temperature of the resistors $R_1$ and $R_2$ was taken as the temperature indicated by the accurately calibrated thermocouple. The only adjustment applied to the data was an accounting for system gain changes. The gain drift between consecutive data points was usually less than 0.1%. The system gain was checked before and after each period of data accumulation. The percentage difference between the maximum and minimum gain measured over the 32-hour data accumulation period was 0.79%.

resistor $R_1$ were essentially identical. The ohmic values of the two resistors tracked very closely over the entire temperature range. Resistor $R_1$ values ranged from 100.51 ohms at 273.2°K to 432.26 ohms at 1275.1°K; $R_2$ varied from 100.41 to 431.85 ohms over the same temperature range.

Theoretically, the product data should fall on a straight line that extends through the origin of an absolute temperature scale. To evaluate the quality of the experimental data, a straight line was determined by two points: The origin of the absolute temperature scale, and the data point at 1019°K which is near the center of the compensation range. This is the straight line shown in FIG. 5 for the $R_2$ column in the table. Computed deviations for the resistance $R_2$, $R_1$ in parallel with $R_2$, and $R_1$ in series with $R_2$ are displayed in the last three columns of the table. The deviations of the data for the temperatures above 729°K (preamplifier noise compensation range) can be accounted for entirely by statistical uncertainties. All seven of the higher temperature points lie within 0.13% of the straight-line calibration. The larger deviations of the four lower temperature points are due primarily to the noise of the preamplifiers.

The effects of severe aging of the sensing resistor were simulated by halving and doubling R at each temperature point. In the compensation range for R, the maximum error in indicated temperature was only −1.00% when R was changed to R/2, and only +0.60% when R was changed to 2R.

The platinum resistance elements experienced some physical change because of their being used 200°K above their upper design temperature of 1123°K. This resulted in a 0.45% change in the indicated ice bath temperature, as determined by measuring the resistance of the platinum elements before and after the experiment. However, the change in the indicated ice bath temperature determined by measuring the thermal noise power generated by the platinum elements was only 0.05%.

The experimental results demonstrated the feasibility of measuring absolute temperature by multiplying the open-circuit rms thermal noise voltage by the short-circuit rms thermal noise current of a resistor. The product signal is not only independent of the construction material and mechanical treatment of the resistor, but is also essentially independent of the ohmic value of the resistor. The fundamental simplicity of the temperature sensor and, indeed, of the concept itself gives

TABLE

| Thermocouple Temperature °K | Sensing Resistance $R_2(\Omega)$ | Noise Product (mV²) | Deviation From Straight Line (%) | | |
|---|---|---|---|---|---|
| | | | R | R/2 | 2R |
| 273.2 | 100.4 | 1355.6 | +7.23 | | |
| 398.9 | 148.2 | 1887.0 | +2.25 | +3.36 | +1.86 |
| 516.4 | 191.7 | 2417.7 | +1.20 | +0.80 | +1.15 |
| 624.4 | 230.2 | 2900.6 | +0.40 | −0.04 | +0.82 |
| 729.3 | 266.3 | 3377.4 | +0.09 | −0.50 | +0.60 |
| 819.7 | 296.7 | 3796.0 | +0.10 | −0.69 | +0.47 |
| 920.0 | 328.9 | 4260.8 | +0.10 | −1.00 | +0.40 |
| 1019.0 | 359.5 | 4714.5 | 0.00 | −0.90 | +0.08 |
| 1106.8 | 385.5 | 5124.0 | +0.07 | −0.74 | +0.15 |
| 1182.3 | 406.7 | 5469.0 | −0.01 | −0.79 | −0.05 |
| 1275.1 | 431.9 | 5897.3 | −0.03 | −0.72 | −0.04 |

Figure 5:
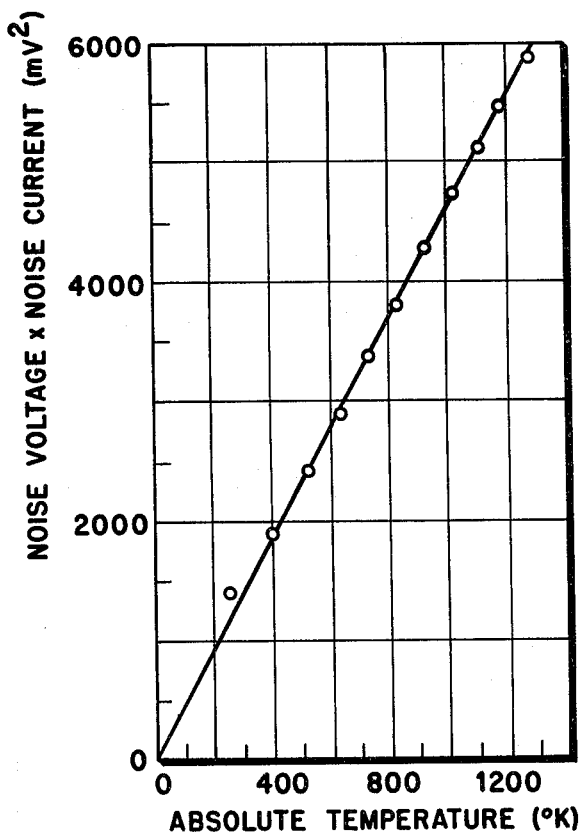
FIG. 5 is a plot illustrating the linear relationship of the thermal noise power measured by the system of FIG. 1 to absolute temperature (°K).

Only the noise product data from one resistor $R_2$ are given in the table and plotted in FIG. 5. The data for this system for thermal noise thermometry great appeal. Furthermore, because the product signal is a linear function of temperature, thermometer calibration is relatively simple. Calibration can be easily accomplished in the field by using a single known data point, since the second point can always be absolute zero.

The field instrument, as shown in FIG. 1, would be operated in the same manner as for the experimental setup with the exception of the automated switching to store the noise voltage and current values in the sample-and-hold circuits 25 and 27 after the specified integrating periods. Subsequently the product of the stored signals is obtained in multiplier 29 to produce the signal $E_o$, which is proportional to the thermal noise power and thus the temperature $T_s$ of the sensing resistor R. The temperature $T_s$ may be read out on a calibrated scale of meter 31.

This system has an advantage in that one readout system may be used for a number of resistor sensors R. For example, in a reactor where a number of points must be monitored and the sensing resistors would be mounted in probes with externally extending leads to measuring stations, the meter may be moved to each of the stations to obtain readings. In this case the system may be calibrated in the laboratory by measuring the product of system gain and noise bandwidth to determine the constant C in the system noise power formula:

$$P_n = CT_s M^{1/2}$$

by using the thermal noise signals from resistors of known values at known temperatures. This method does not require using the actual sensing resistors.

The system for thermal noise thermometry presented in this application could be used to produce an absolute temperature scale. The preamplifier noise contributions would be accurately known and could therefore be removed from the data if the value of the sensing resistor were essentially invariant with temperature. Materials such as constantan and Nichrome-5 may be suitable for the fabrication of such resistors. The signal processing system could be in a controlled laboratory environment and, consequently, have a very stable gain and noise bandwidth. The product of the system gain and noise bandwidth could in principle be measured without involving temperature to obtain the constant C. Long integration times would allow small statistical errors. Extraneous signals could be eliminated by elaborate shielding and by using power supplies designed for negligible ripple.

Depending on the accuracy of the temperature measurement to be made, it is possible to eliminate the switching functions of the circuit of FIG. 1 by using two sensing resistors $R_r$ and $R_i$ with separate noise voltage and current-sensing channels connected to the product inputs of an analog multiplier to provide a continuous on-line temperature measurement. It is only necessary that the ratio $R_r$ to $R_i$ remain constant over the temperature range of interest, i.e., the two resistors must track essentially the same over the temperature range. The major problem in the measurement of high temperatures using the two-resistor technique is the fabrication of two sensing resistors with similar aging and tracking characteristics. The two platinum resistors used in the experimental setup, described above, should give excellent tracking performance and practically identical aging characteristics over a range similar to the experimental temperature range. The data indicate that temperature measurement errors due to tracking imperfections for the two platinum elements were less than 0.1%.

This means of thermal noise measurement may also be used to determine the value of the sensing resistor. Specifically, the ratio of the rms noise voltage and the rms noise current is a quantity that is independent of temperature and is a linear function of the value of the resistance. Since at high temperatures thermally generated DC voltages and currents can cause great errors in the measurement of resistance using DC signals, the measurement of thermal noise to determine resistance may be a useful technique for studying the resistivity of materials at high temperatures.

Thus, it will be seen that a very versatile system has been provided for thermal noise thermometry by measuring the thermal noise power generated in a sensing resistor which is independent of the resistance value of the sensing resistor. It will be obvious to those skilled in the art that various modifications and changes may be made in the described system without departing from the spirit and scope of the invention as set forth in the following claims.

What is claimed is:

1. A system for measuring temperature, comprising:
   a sensing resistor disposed in a medium whose temperature is to be measured;
   a voltage-sensitive preamplifier for sensing the AC thermal noise voltage generated in said sensing resistor;
   a current-sensitive preamplifier for sensing the AC thermal noise current generated in said resistor and generating a signal at an output thereof having an amplitude proportional to the thermal noise current;
   a first switching means for alternately connecting said sensing resistor to the inputs of said voltage-sensitive preamplifier and said current-sensitive preamplifier;
   an amplifier including a plurality of cascaded passive filters for controlling the system frequency bandpass;
   a second switching means for alternately connecting the outputs of said voltage-sensitive preamplifier and said current-sensitive preamplifier to said amplifier in sequence with said first switching means;
   a true root means squared detector means for generating DC output signals proportional to the root mean squared noise signals applied to the input thereof;
   first and second storage means for storing said DC signals detected from said voltage-sensitive preamplifier and said current-sensitive preamplifier, respectively; and
   a signal multiplier means responsive to stored DC signals in said first and second storage means for providing an output signal having an amplitude proportional to the product of the detected thermal noise voltage signal and thermal noise current signal, which is indicative of the absolute temperature of said medium.

2. The temperature measuring system as set forth in claim 1 further including a signal integrator circuit connected in series with the output of said detector means for integrating the DC signals applied thereto to obtain the average DC signal value.

3. The temperature measuring system as set forth in claim 2 wherein the frequency bandpass of said amplifier is about 40 KHz centered at about 45 KHz.

4. The temperature measuring system as set forth in claim 2 wherein said first and second storage means include first and second sample-and-hold circuits and a third switching means for alternately connecting the output of said integrator circuit to said first and second sample-and-hold circuits in sequence with said first switching means.

5. The temperature measuring system as set forth in claim 4 further including a control means having a fixed frequency clock signal source for automatically setting said first, second, and third switching means in a first position to sense said thermal noise voltage and subsequently activating said first sample-and-hold circuit to store the DC signal proportional to said thermal noise voltage signal, alternately setting said first, second, and third switching means in a second position to sense said thermal noise current and subsequently activating said second sample-and-hold circuit to store the DC signal proportional to said thermal noise current and providing a readout signal to said first and second sample-and-hold circuits simultaneously so that said stored DC signals are simultaneously applied to said multiplier means.

6. The temperature measuring system as set forth in claim 5 wherein said integrator circuit includes a start input and a stop input for receiving control signals from separate outputs of said control means for controlling the time said DC signals are integrated during each of the alternate periods in which said thermal noise voltage signals and said thermal noise current signals are sensed.

7. The temperature measuring system as set forth in claim 6 further including a voltmeter connected to the output of said multiplier means, said voltmeter being calibrated to read the temperatures of said medium in degrees absolute.

8. The temperature measuring system as set forth in claim 7 wherein said sensing resistor has a resistance in the range of from about 150 to 1500 ohms for temperatures above about 300° absolute.

* * * * *